Feb. 14, 1956  P. P. SCOTT, JR., ET AL  2,734,861
COMPOSITION AND PROCESS FOR PLUGGING PERMEABLE FORMATIONS
Filed Feb. 13, 1952
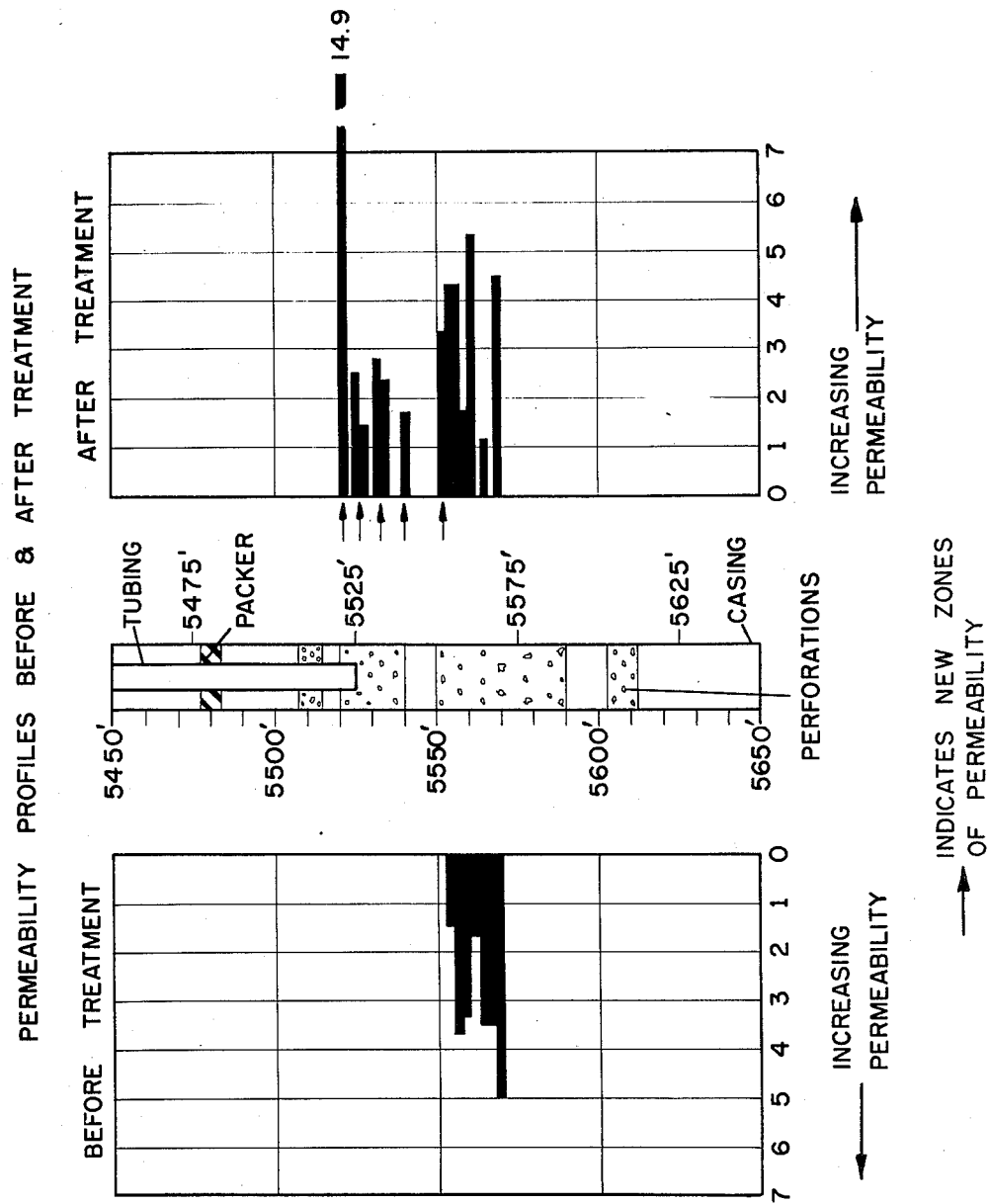
PLATHO P. SCOTT, JR.
ROBERT P. MURPHY, JR.
INVENTORS
BY [signature] Goodwin
ATTORNEY

2,734,861

COMPOSITION AND PROCESS FOR PLUGGING PERMEABLE FORMATIONS

Platho P. Scott, Jr., and Robert P. Murphy, Jr., Tulsa, Okla., assignors to Stanolind Oil and Gas Company, Tulsa, Okla., a corporation of Delaware Application February 13, 1952, Serial No. 271,384

12 Claims. (Cl. 252—8.55)

This invention pertains to an improved composition and process for temporarily sealing the pores or fractures in a formation penetrated by a well. More particularly, this invention pertains to an improved bridging material and suspending agent therefor which are adapted to plug highly permeable zones such as fractures in a well during hydraulic fracturing operations.

In a copending application of Joseph B. Clark, Serial Number 234,927, filed July 3, 1951, a method of producing multiple fractures in formations by the application of high hydraulic pressures has been proposed. In that process, it was proposed, more particularly, to incorporate temporary bridging materials in a gelled fracturing liquid to plug fractures or other high permeability zones penetrated by a well so that a number of fractures could be produced when a fracturing liquid is injected into a confined zone of a well under high pressure.

It is an object of this invention to provide an improved composition for the process of producing multiple fractures in the formations penetrated by a well. It is a more specific object of this invention to provide an improved liquid including a temporary bridging material incorporated in a viscous liquid for producing multiple fractures in a formation penetrated by a well. A still further object of this invention is to provide an improved composition for temporarily sealing fractures and highly permeable formations to regain lost circulation during the drilling of oil and gas wells. These and additional objects will become apparent from the following description in which reference will be made to the accompanying drawing.

This drawing shows in diagrammatic form a cross section of a well having perforated sections and contiguous thereto permeability profiles of this well made before a treatment employing our composition and after such a treatment.

Our composition comprises, in brief, a carrying or suspending liquid having sufficient viscosity and/or gel strength to support finely divided solids and a granular-type bridging agent consisting of a polycyclic aromatic compound, such as the high melting point derivatives of coal tar distillates in finely divided particles. In order to produce multiple fractures in a formation without setting packers to isolate permeable or fractured zones into which the fracturing liquid might otherwise flow, any such zones in the open section of a well are sealed temporarily by incorporating in a viscous carrier liquid small solid particles which tend to bridge at the formation face and provide a base on which the smaller particles including the colloidal particles in the carrier liquid can bridge and produce an impermeable barrier. But for the bridging material, it appears that fluids carrying only particles of colloidal size will not produce a filter cake on the well wall and the total fluid flow through permeable formations. When such zones and fractures are thus sealed and when additional fluid is injected into the well to increase the hydrostatic pressure therein, it has been found that an additional fracture can be created and that this new fracture will then take fluid and be extended until it, in turn, is sealed at the formation face in the well with bridging material, colloidal material, and the like. We have found that a gelled liquid containing certain coal tar derivatives is highly superior in a number of respects to compositions previously proposed for producing multiple fractures in a formation with a liquid which can be subsequently removed.

The carrier liquid is, as used in this application, a liquid which, with respect to the natural liquids in the well such as water or crude oil, has a considerably retarded tendency to filter through the formation. These liquids, in general, have a greater viscosity than water or the average crude oil, thus reducing their filtration into permeable formations and increasing their ability to carry or suspend solids such as bridging materials. Well fluids have a viscosity at the surface temperature of less than about 10 centipoises, usually about 1 or 2 centipoises. Viscosities are, of course, lower at formation temperatures. A carrier liquid, in contrast, has a viscosity of greater than about 30 centipoises, typically, from about 75 to several hundred centipoises or higher. A viscosity in the range 2000–5000 centipoises is preferred. Liquids having higher viscosities can be employed, but their pumpability is lower, increasing handling difficulties.

While this invention is not specifically limited to the carrier liquid, a gel or gelled liquid having the properties above specified is prefered. The carrier liquid consists essentially of a base liquid such as water or a liquid hydrocarbon and a gelling agent. The base liquid is preferably compatible with the fluids in the formations to be fractured. For example, for use in an oil- or gas-producing formation, the base liquid is preferably a hydrocarbon such as crude oil or a refined hydrocarbon such as gasoline, kerosene, or the like. This base liquid may be gelled by a number of means including, for example, the addition of a metallic soap or a high molecular weight polymer, such as polypropylene. Also, oil-dispersible plastering agents such as blown asphalt or pitch may be added to the oil base to gel it and reduce its filtrate rate. Likewise, natural and synthetic rubbers, as well as resins such as the polyacrylates, can be used to produce a carrier liquid having a high viscosity and a low filtrate rate. The preferred gelling agent consists of the salts of fatty acids, particularly the metallic soaps which have the ability to form hydrocarbon gels at atmospheric temperatures. A suitable soap of this type has been widely used by the Chemical Corps, U. S. Army, and is known as napalm. It has been described in an article entitled "Napalm," Industrial and Engineering Chemistry, vol. 38, No. 8, page 768, and in an article entitled "The use of thickened gasoline in warfare," Armed Forces Journal, vol. IV, No. 3, January, 1951, page 26. This combination of aluminum soaps of the coconut fatty acids, oleic acid, and naphthenic acid gives a gelling agent of distinctive and superior properties which have been found to be highly satisfactory in the art of fracturing formations by the use of hydraulic pressure. From about 3 to about 10 per cent by weight of this napalm-type soap dispersed in crude oil or refined hydrocarbons such as gasoline or kerosene produces a carrier liquid having a filtrate rate between from about 1 to about 100 cc. in thirty minutes and a viscosity as great as about 5000 centipoises or higher.

To this carrier liquid we add certain compounds which are, typically, coal tar fractionation derivatives, i. e., derivatives which are obtained from the coal tar itself and not from the addition of a material to coal tar. These compounds fall generally in the class of polycyclic aromatic compounds which are solids at surface temperatures and only slightly soluble in the carrier liquid. The preferred bridging materials are cyclic compounds having condensed structures, i. e., two or more benzene rings mutually sharing two adjoining carbon atoms. This class of materials which, in general, is a by-product of the coal tar industry, is a fractionation derivative of the coal tar distillates having a boiling point in the range 200–350° C. The most common members of this class are naphthalene and anthracene which have minimum freezing points substantially above atmospheric temperature (greater than 100° F.), and which are both substantially insoluble in water and soluble in most organic solvents including most crude oils. Other polycyclic aromatic compounds, such as methylnaphthalene, acenaphthene, fluorene, phenanthrene, chrysene, and the like, which, in general, fall in this same class of materials but which are less common commodities, are also contemplated. The compound used in each case can be selected depending upon its melting point, solubility in the carrier liquid, the atmospheric temperature, and the like. The bridging agent should, of course, be and remain solid, discrete particles at atmospheric temperature and even though it may be slightly soluble in the carrier liquid a sufficient amount should be added to provide a substantial percentage of solid particles after the carrier liquid becomes saturated. In some cases, particularly in wells which do not produce crude oil or another liquid which will dissolve the solid bridging material, it may be desirable to select a bridging material of this type having a melting point below the well temperature at the point where the seal is produced. A combination or alloy of two or more of the pure compounds may be used to produce a bridging material having the proper melting point. In such case, after the well has been treated by the relatively cool fracturing liquid, i. e., the slurry of bridging material in carrier liquid, the temperature of the liquid rises gradually to the formation temperature at which these solids become liquid and may be produced from the well. In the preferred embodiment, the bridging materials being oil soluble, they are removed by flow of oil into the well through the particles.

The slurry of granular bridging material in carrier liquid is prepared by batch mixing at the surface. Alternatively, the slurry may be produced by mixing the ingredients, including the gelling agent and the bridging material, in the tubing or by a jet-type mixer as the base liquid enters the tubing. The amount of bridging material added to the carrier liquid may be varied over a substantial range depending, among other things, upon the consistency of the carrier liquid, the solubility of the bridging material in the base liquid, and the amount of liquid which is to be injected into a fracture before that fracture is sealed. We have found, for example, that a bridge will form in a fracture more rapidly the higher the concentration of the bridging material. The concentration of the bridging material cannot, however, be increased indefinitely since pumps are unable to handle extremely high concentrations. It is considered desirable in most cases to inject between about 1 and about 10 barrels of fracturing liquid or the carrier liquid therein into a fracture before that fracture is sealed.

With naphthalene granules as the bridging material, it has been found that about 50 pounds will dissolve in a barrel, 42 gallons, of gelled kerosene. After the gelled kerosene becomes saturated, we add between about 100 and 500, preferably between about 200 and about 300 pounds of naphthalene granules per barrel of hydrocarbon fracturing liquid. The solubility in a hydrocarbon of the other bridging materials in this class varies, but in general the amount of bridging material added, after the carrier liquid becomes saturated, is about the same.

The granular bridging agent is preferably added to the fracturing liquid in a gradation of particle sizes since uniform-sized particles are less effective in sealing a fracture of permeable formations. That is, the permeability of a bridged fracture or pore appears to vary directly as a function of the size of the smallest particles. The coarser particles bridge in a fracture or pore but by themselves offer only a minor amount of resistance to flow. The particles of intermediate size bridge on the larger particles and thus provide a base on which the finer particles bridge. The finer particles then produce a high resistance to flow and, in effect, plug the larger fractures and pores. Similarly, the fine particles themselves bridge the smaller fractures and pores and increase the resistance to flow through the pore. The advantages of both are obtained in a bridging material having a gradation of particle sizes. The larger particles are preferably less than about 3/16 inch in maximum dimension, i. e., 4 mesh U. S. sieve. There is no limit on the size of the smaller particles since some of these particles will, of course, go into solution in the fracturing liquid. We have found that for best results in the average well, about 50 per cent of the particles or granules added to the fracturing liquid should be in and cover substantially the range 4–10 mesh U. S. sieve and the remainder of the particles should be smaller.

This fracturing liquid slurry is displaced to the bottom of the well by, for example, pumping crude oil into the tubing following the slurry. Pressure is then applied until the pressure at the formation is great enough to fracture or part the formation. This process is described in detail in Re. 23,733. Filtrate from the fracturing liquid then flows into the fracture or passage in the formation until a bridge is produced in the well over the fracture and the fracture is sealed. If sufficient pressure is applied, the formation can be fractured again and again at different locations, each successive fracture being closed before a high pressure can be built up to produce the next fracture. Only one batch of the slurry need be employed for all such fractures.

It will be apparent that our composition can be used in other processes than that above described. For example, when a fracture is produced and sealed and before a well is produced to remove the bridging material, a viscous liquid, such as the carrier liquid which does not contain the bridging material, may be injected into the formation at high pressure to produce a second fracture at the next weakest zone in the well. That fracture may be extended into the formation by pumping the viscous or gelled liquid thereinto and then the fracture may be sealed, if desired, by a subsequent injection of the fracturing liquid which contains bridging material.

As an example of the effectiveness of the fracturing liquid and bridging material herein disclosed for sealing a well, a 5,640 foot well in the Sholem Alechem Field, Oklahoma, was treated as follows. A permeability survey was first run to determine the location of permeable zones. This permeability log is shown in the drawing. Twenty barrels of kerosene containing 6 per cent of napalm soap and having a viscosity of about 5000 centipoises were then pumped through 2½ inch tubing into the well below a retainer set at 5,480 feet. The formation was fractured at a surface pressure of 2200 p. s. i. and the gel was displaced into the formation at an average surface pressure of about 1850 p. s. i. with 35 barrels of crude oil. Subsequently, 6 barrels of the same gel to which had been added 1,200 pounds of granular naphthalene having a gradation of particles covering the range 4–100 mesh U. S. sieve were displaced into the tubing. This slurry was displaced to bottom with 20 barrels of the same gel less bridging material. When the gel containing the granular naphthalene reached bottom, the surface pressure increased to 2600 p. s. i. before a second fracture occurred—400 pounds higher than the former formation breakdown pressure—the rise in pressure above 2200 p. s. i. indicating that the first fracture was sealed. After the second fracture at 2600 p. s. i., the plain gel was displaced into the passages formed by the fracture at a surface pressure of 2000 p. s. i. Thirty-five barrels of crude oil were then pumped into the tubing to displace the plain gel into the formation. Following the crude oil, 8 barrels of slurry containing 6 barrels of plain gel to which had been added 1,200 pounds of granular naphthalene—50 per cent through 4 mesh and retained on 10 mesh, and 50 per cent through 10 mesh—were pumped into the tubing. Next, 20 barrels of plain gel were pumped into the tubing displacing the slurry of bridging material to the bottom of the well. The pressure built up to about 3100 p. s. i. when the bridging material hit the formation. At that pressure the formation broke down again and the plain gel was pumped into the formation at about 2000 p. s. i. Following the plain gel, a gel breaker solution consisting of 45 gallons of dibutylamine in 140 barrels of crude oil was pumped into the formation and displaced from the well with 40 barrels of crude oil. A subsequent permability survey reproduced in the drawing indicated that several areas in the well which previous to treatment were impermeable now had a relatively high permeability. Furthermore, the production from the well was increased from 63 to 262 barrels of oil per day sustained production, i. e., after treating hydrocarbons had been recovered.

This invention has been described by reference to certain preferred embodiments, namey, the use of certain classes of bridging materials in fracturing liquids. It will be apparent that the invention is not limited to use in a hydraulic fracturing process and that it will be applicable to a number of well treating operations. In the drilling of oil wells through permeable oil-producing formations, it is sometimes desirable to plug such permeable formations temporarily to prevent loss of the drilling fluid thereinto. Clearly, the bridging materials herein disclosed may be incorporated in either water- or oil-soluble carrying fluids to provide a bridge in such formation and such bridge can be removed by subsequent oil production to great advantage. Furthermore, these materials being water-insoluble will often function to shut off water when small particles penetrate a water-producing formation. Manifestly, this invention is therefore not limited to the examples given above and is capable of substantial modification and a number of uses. The invention should therefore be construed to be limited only by the scope of the appended claims.

We claim:

1. In a composition for bridging fractures in a well the combination of a gelled hydrocarbon which serves as a carrying liquid and between about 200 and 300 pounds of a granular bridging material per barrel of said gelled hydrocarbon, said bridging material comprising a polycyclic aromatic hydrocarbon compound having a freezing point above about 100° F.

2. A composition for temporarily bridging fractures in an oil-producing formation penetrated by a well including an oil-soluble granular polycyclic aromatic hydrocarbon bridging material having a gradation of particles covering the range of about 4–100 mesh U. S. sieve and a pumpable carrier liquid comprising a gelled hydrocarbon, said bridging material being suspended in said carrier liquid.

3. A composition according to claim 2 in which said gelled hydrocarbon consists essentially of a light hydrocarbon liquid and about 3–10 percent by weight of a napalm-type soap.

4. A composition according to claim 2 in which the viscosity of said gelled hydrocarbon is greater than about 2000 centipoises.

5. A composition for temporarily bridging fractures in an oil-producing formation penetrated by a well including as a carrier liquid a gelled hydrocarbon and as a bridging material a granulated coal tar derivative selected from the group consisting of naphthalene and anthracene.

6. A composition for temporarily bridging fractures in an oil-producing formation penetrated by a well including as a carrier a liquid a hydrocarbon containing pitch and as a bridging material a granulated coal tar derivative selected from the group consisting of naphthalene and anthracene, the concentration of said pitch in said hydrocarbon being sufficient to produce a gel that will substantially support said bridging material under well conditions.

7. A composition for temporarily bridging fractures in an oil-producing formation penetrated by a well including granular naphthalene and a gelled carrier liquid having sufficient viscosity substantially to retard settling of said granular naphthalene in said carrier liquid, said naphthalene being substantially insoluble in said gelled carrier liquid.

8. A composition according to claim 7 in which said granular naphthalene has a gradation of particles covering substantially the range 4–100 mesh U. S. sieve and in which the viscosity of said carrier liquid is in the range of about 2000–5000 centipoises.

9. A composition for temporarily bridging fractures in an oil-producing formation penetrated by a well including a gelled carrier liquid comprising a light hydrocarbon with a dispersed napalm-type soap and having a viscosity in the range 2000–5000 centipoises and a bridging material comprising between about 200 and 300 pounds per barrel of granular naphthalene having a gradation of particles covering substantially the range 4–100 mesh U. S. sieve, said bridging material being dispersed in said carrier liquid.

10. A process for temporarily sealing a flow channel in a well comprising injecting into said well between about 100 and about 500 pounds per barrel of a granular polycyclic aromatic hydrocarbon bridging agent suspended in a pumpable liquid having a viscosity greater than about 30 centipoises, said granular polycyclic aromatic hydrocarbon having a gradation of particles in which about one-half cover substantially the range 4–10 mesh U. S. sieve and the remainder of the particles cover a range of about 10 mesh U. S. sieve and smaller, and said granular polycyclic aromatic hydrocarbon being only slightly soluble in said liquid.

11. A process for temporarily sealing a flow channel in a well comprising injecting into said well between about 100 and 500 pounds per barrel of a granular polycyclic aromatic hydrocarbon bridging agent suspended in a pumpable liquid having a viscosity greater than about 30 centipoises, said granular polycyclic aromatic hydrocarbon having a gradation of particles throughout substantially the range 4–100 mesh U. S. sieve and said granular polycyclic aromatic hydrocarbon being only slightly soluble in said liquid.

12. A composition for temporarily bridging fractures in an oil-producing formation penetrated by a well including an oil-soluble granular polycyclic aromatic hydrocarbon bridging material having a gradation of particles covering the range of about 4–100 mesh U. S. sieve and a pumpable carrier liquid comprising a hydrocarbon having a viscosity at room temperature of at least 30 centipoises, said bridging material being suspended in said carrier liquid.

References Cited in the file of this patent

UNITED STATES PATENTS

| | | |
|---|---|---|
| 1,705,862 | Hartzell et al. | Mar. 19, 1929 |
| 1,734,990 | Ackerman | Nov. 12, 1929 |
| 1,742,020 | Ackerman | Dec. 31, 1929 |
| 2,092,936 | Smith | Sept. 14, 1937 |
| 2,139,595 | Lerch | Dec. 6, 1938 |
| 2,161,245 | Cain et al. | June 6, 1939 |
| 2,542,020 | Fischer | Feb. 20, 1951 |
| 2,588,808 | Dawson | Mar. 11, 1952 |
| 2,604,448 | Wilson | July 22, 1952 |
| 2,607,731 | Fischer | Aug. 19, 1952 |

FOREIGN PATENTS

| | | |
|---|---|---|
| 16,132 | Great Britain | 1909 |
| 196,012 | Great Britain | Apr. 16, 1923 |